US012711486B2

(12) United States Patent
Braun et al.

(10) Patent No.: US 12,711,486 B2
(45) Date of Patent: Aug. 18, 2026

(54) MODULAR SETTLEMENT DISTRIBUTION ARCHITECTURE AND METHODS

(71) Applicant: State Farm Mutual Automobile Insurance Company, Bloomington, IL (US)

(72) Inventors: Jacob Braun, Oviedo, FL (US); Justin Johnsen, Heyworth, IL (US); Emily Burger, Boston, MA (US); Michael D. Mai, Lewisville, TX (US); Daniel Bugner, Clinton, IL (US); Vahini Dakavarapu, Bloomington, IL (US); Matthew S. Caplinger, Bloomington, IL (US); Joshua DeKeersgieter, Columbus, OH (US); Beth A. Mennenga, Irving, TX (US); Sheshunath Bollam, Bloomington, IL (US)

(73) Assignee: State Farm Mutual Automobile Insurance Company, Bloomington, IL (US)

( * ) Notice: Subject to any disclaimer, the term of this patent is extended or adjusted under 35 U.S.C. 154(b) by 106 days.

(21) Appl. No.: 18/651,602

(22) Filed: Apr. 30, 2024

(65) Prior Publication Data

US 2025/0335895 A1 Oct. 30, 2025

(51) Int. Cl.
*G06Q 20/22* (2012.01)
*G06Q 40/08* (2012.01)

(52) U.S. Cl.
CPC ........... *G06Q 20/227* (2013.01); *G06Q 40/08* (2013.01)

(58) Field of Classification Search
CPC ............................ G06Q 20/227; G06Q 40/08
USPC ........................................................ 705/3–44
See application file for complete search history.

(56) References Cited

U.S. PATENT DOCUMENTS 5,956,687 A 9/1999 Wamsley et al.
8,615,451 B1 * 12/2013 Thiele .................. G06Q 10/067 705/28
8,666,888 B2 * 3/2014 Edmonds ............... G06Q 20/26 705/39

(Continued)

FOREIGN PATENT DOCUMENTS

CN 114202419 A * 3/2022 ............. H04L 69/06

OTHER PUBLICATIONS

Jiang et al., "A Privacy-Preserving E-Commerce System Based on the Blockchain Technology", School of Software Engineering, Xi'am Jiaotong University, Xi;am, China 710049, Iwbose . (Year: 2019).*

(Continued)

*Primary Examiner* — Frantzy Poinvil
(74) *Attorney, Agent, or Firm* — Armstrong Teasdale LLP

(57) ABSTRACT

A modular settlement distribution architecture includes an input node to a plurality of parallel settlement routes and an output node from the plurality of settlement routes. A resource routing (RR) computing device of the modular settlement distribution architecture includes a settlement engine configured to control settlement distribution messages to the settlement routes via a settlement engine as the input node. The RR computing device and/or a distribution and reporting (DR) module separate from the settlement engine is configured to control receipt of confirmation messages from the settlement routes as the output node.

17 Claims, 6 Drawing Sheets

(56) References Cited

U.S. PATENT DOCUMENTS

| | | | | |
|---|---|---|---|---|
| 8,732,044 | B2 * | 5/2014 | Lovelett | G06Q 20/10<br>705/38 |
| 11,501,370 | B1 * | 11/2022 | Paya | H04L 9/0819 |
| 2002/0169713 | A1 * | 11/2002 | Chang | G06Q 20/04<br>705/39 |
| 2015/0254649 | A1 * | 9/2015 | Radu | G06Q 20/367<br>705/16 |
| 2016/0063435 | A1 * | 3/2016 | Shah | G06Q 30/0633<br>705/44 |
| 2018/0268387 | A1 * | 9/2018 | Bradley | G06Q 20/306 |
| 2019/0109915 | A1 * | 4/2019 | McPhee | H04L 51/224 |
| 2020/0090092 | A1 | 3/2020 | Cantley et al. | |
| 2020/0104812 | A1 | 4/2020 | Chen et al. | |
| 2020/0234387 | A1 | 7/2020 | Hudgens et al. | |
| 2021/0027293 | A1 * | 1/2021 | Groarke | G06Q 20/401 |

OTHER PUBLICATIONS

Stankey, “Internet Payment Systems: Legal Issues Facing Business, Consumers and Payment Service Providers”, Commlaw Conspectus, vol. 6, . (Year: 1988).*

* cited by examiner

MODULAR SETTLEMENT DISTRIBUTION ARCHITECTURE AND METHODS

FIELD OF THE DISCLOSURE

The present disclosure relates to settlement distribution systems and, more particularly, to a modular settlement distribution architecture to enable improved processing availability and flexibility across multiple resource channels.

BACKGROUND

Computer networks send electronic messages between multiple nodes within the network. These messages include a variety of data and can be used in many different industries. In one example, electronic messages are sent between parties in a computer network when a consumer (or policyholder) makes a transaction related to an insurance product. Insurance companies maintain records related to these transactions.

Consumers use various payment methods to make such transactions, including (but not limited to) automated clearinghouse (ACH) transactions, credit cards, debit cards, checks, and the like. It is contemplated that new payment methods may be developed and implemented in the future, and consumers may use such new payment methods to make financial transactions.

Therefore, it would be desirable to enable consumers to use any payment method while enabling accurate and consistent record-keeping of transactions.

BRIEF SUMMARY

The present embodiments may relate to, inter alia, modular settlement distribution architectures, and systems and methods for providing and using the same. A modular settlement distribution architecture, as described herein, may include a resource routing (RR) computer device that is in networked communication with a plurality of parallel downstream settlement routes, as well as at least one database, such as a reporting database. The RR computer device may be configured to function as an input node to the settlement routes and/or as an output node from the settlement routes.

In one aspect, a modular settlement distribution architecture may be provided. The modular settlement distribution architecture may include a computer system, one or more local or remote processors, servers, sensors, memory units, transceivers, mobile devices, wearables, smart watches, smart glasses or contacts, augmented reality glasses, virtual reality headsets, mixed or extended reality headsets, voice bots, chat bots, ChatGPT bots, and/or other electronic or electrical components, which may be in wired or wireless communication with one another. For instance, the modular settlement distribution architecture may include a reporting database and a resource routing (RR) computing device. The RR computing device may include at least one processor and at least one memory device. The RR computing device may be modularly coupled to and in network communication with a plurality of parallel settlement routes such that the RR computing device is at least one of a same input node to each of the plurality of settlement routes or a same output node from each of the plurality of settlement routes. The at least one processor may be programmed to: (i) receive an initiation message including a transaction identifier (TID) and a product code associated with a completed transaction; (ii) in response to receiving the initiation message, execute a settlement engine having access to a modular distribution message template; (iii) query, by the settlement engine, a remote data aggregator using the TID, to cause the remote data aggregator to return a resource channel indicator, indicating a type of a resource channel used in the completed transaction, and limited data elements that are associated with the resource channel type; (iv) based on the resource channel indicator, populate, by the settlement engine, the modular distribution message template with the TID, the product code, and the limited data elements to generate a distribution message; and/or (v) based on the resource channel indicator, route, by the settlement engine, the distribution message to a corresponding one of the plurality of settlement routes. Methods and programs (e.g., at least one non-transitory computer-readable storage media having computer-executable instructions embodied thereon) for implementing the same may also be provided. The modular settlement distribution architecture may include additional, less, or alternate functionality, including that discussed elsewhere herein.

In another aspect, a resource routing (RR) computing device may be provided. The RR computing device may be modularly coupled to and in network communication with a plurality of parallel settlement routes such that the RR computing device is at least one of a same input node to each of the plurality of settlement routes or a same output node from each of the plurality of settlement routes. The RR computing device may include a computer system, one or more local or remote processors, servers, sensors, memory units, transceivers, mobile devices, wearables, smart watches, smart glasses or contacts, augmented reality glasses, virtual reality headsets, mixed or extended reality headsets, voice bots, chat bots, ChatGPT bots, and/or other electronic or electrical components, which may be in wired or wireless communication with one another. For instance, the RR computing device may include at least one processor that may be programmed to: (i) receive an initiation message including a transaction identifier (TID) and a product code associated with a completed transaction; (ii) in response to receiving the initiation message, execute a settlement engine having access to a modular distribution message template; (iii) query, by the settlement engine, a remote data aggregator using the TID, to cause the remote data aggregator to return a resource channel indicator, indicating a type of a resource channel used in the completed transaction, and limited data elements that are associated with the resource channel type; (iv) based on the resource channel indicator, populate, by the settlement engine, the modular distribution message template with the TID, the product code, and the limited data elements to generate a distribution message; and/or (v) based on the resource channel indicator, route, by the settlement engine, the distribution message to a corresponding one of the plurality of settlement routes. Methods and programs (e.g., at least one non-transitory computer-readable storage media having computer-executable instructions embodied thereon) for implementing the same may also be provided. The RR computing device may include additional, less, or alternate functionality, including that discussed elsewhere herein.

In some aspects, a computer-implemented method for settlement distribution may be provided. The computer-implemented method may be implemented using a computer system, one or more local or remote processors, servers, sensors, memory units, transceivers, mobile devices, wearables, smart watches, smart glasses or contacts, augmented reality glasses, virtual reality headsets, mixed or extended reality headsets, voice bots, chat bots, ChatGPT bots, and/or other electronic or electrical components, which may be in wired or wireless communication with one another. For instance, the computer-implemented method may be implemented using a resource routing (RR) computing device including a memory and a processor communicatively coupled to the memory. The RR computing device may be modularly coupled to and in network communication with a plurality of parallel settlement routes such that the RR computing device is at least one of a same input node to each of the plurality of settlement routes or a same output node from each of the plurality of settlement routes. The method may include: (i) receiving an initiation message including a transaction identifier (TID) and a product code associated with a completed transaction; (ii) in response to receiving the initiation message, executing a settlement engine having access to a modular distribution message template; (iii) querying, by the settlement engine, a remote data aggregator using the TID, to cause the remote data aggregator to return a resource channel indicator, indicating a type of a resource channel used in the completed transaction, and limited data elements that are associated with the resource channel type; (iv) based on the resource channel indicator, populating, by the settlement engine, the modular distribution message template with the TID, the product code, and the limited data elements to generate a distribution message; and/or (v) based on the resource channel indicator, routing, by the settlement engine, the distribution message to a corresponding one of the plurality of settlement routes. Methods may include additional, fewer, or alternative steps, including those described elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

Figure 1:
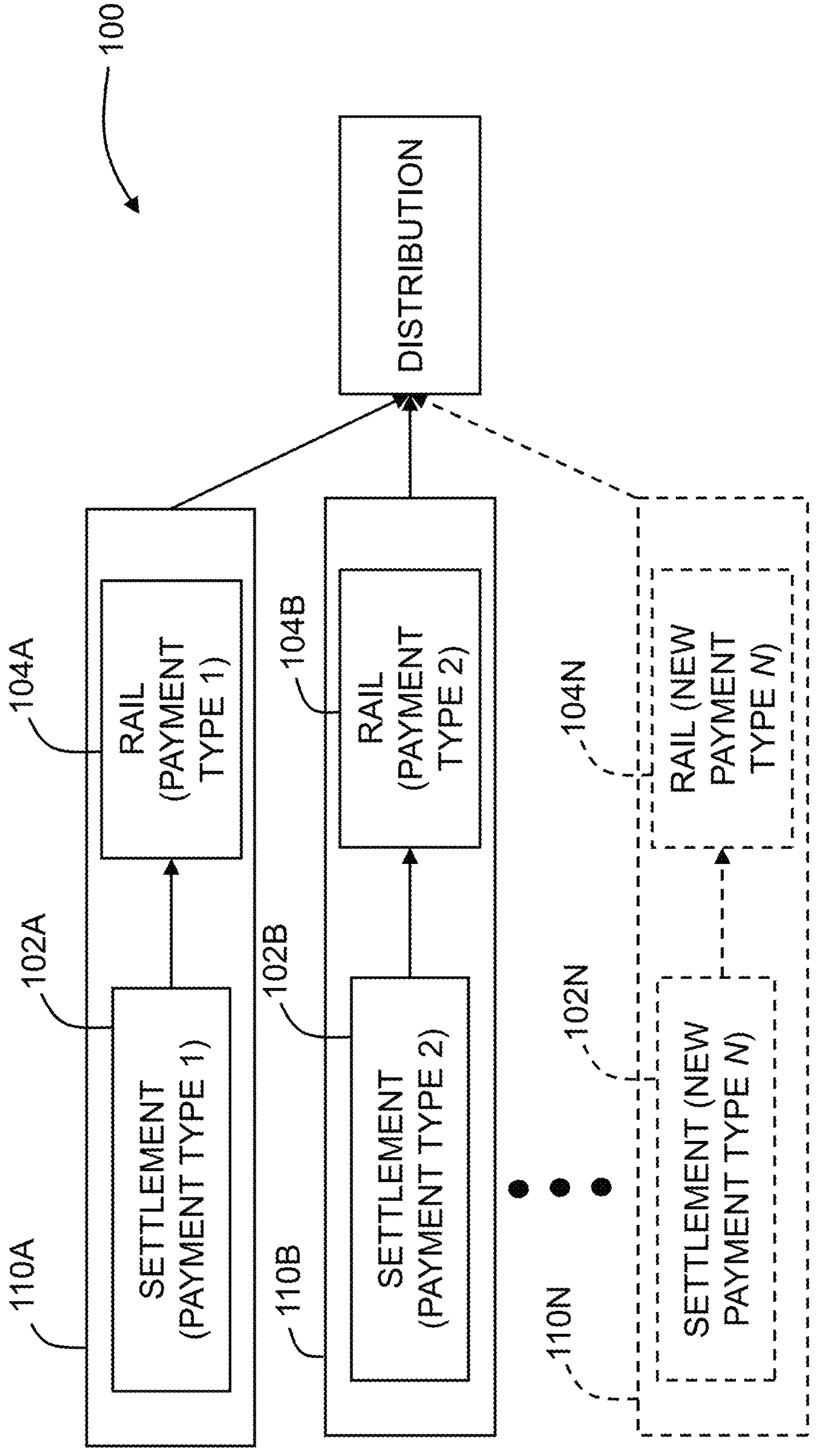
FIG. 1 is a schematic dataflow of conventional settlement distribution architecture.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION OF THE DRAWINGS

The present embodiments may relate to, inter alia, a modular settlement distribution architecture, and systems and methods for providing and using the same. The modular settlement distribution architecture may include a resource routing (RR) computing device that may be in network communication with a plurality of parallel downstream settlement routes. Each settlement route may be associated with a different resource channel type. The RR computing device may be in further communication with at least one database, including a reporting database. The RR computing device may be configured to route settlement distribution messages to one of the settlement routes based upon the resource channel type of the settlement distribution messages. Notably, the RR computing device may include a settlement engine that is configured to couple the RR computing device to each of the settlement routes in a "plug-and-play" or modular manner. As such, the RR computing device may function in a route-agnostic, resource channel-agnostic manner, or virtually the same regardless of the resource channel type or settlement route.

In certain industries, such as the insurance industry, consumers pay for products, such as different insurance products (e.g., home, auto, life, pet insurance policies). It is common for an industry member, such as an insurance provider, to offer the consumer the opportunity to pay for their insurance products using different payment methods, such as via an ACH payment, via check, via payment card (e.g., debit card, credit card). These payment methods are referred to herein as "resource channels," because these different payment methods often require processing over different processing networks (channels or "rails") and according to varying processing protocols to move the resource (payment) from one financial institution to another.

Moreover, at least in the insurance industry, payments made over different resource channels are settled in different ways, based at least in part upon how the payment is initiated (which may be related to a product being paid for) and/or a payment type being used. For example, ACH payments are settled according to one protocol, and card payments are settled according to a different protocol. That is, each resource channel requires a different settlement route. Moreover, continuing with the example related to insurance products, a payment made through an insurance agent as the payment source is processed over a different processing "rail" or network and/or with different payment information data elements than a payment made through a mobile application as a payment source. Different locations at which payments are initiated map to different entry points, based at least in part on their payment type, to be settled. This leads to a very complex network of interactions that is difficult to maintain.

In existing settlement architecture 100, as shown in FIG. 1, each resource channel 102A, 102B, 102N has a completely different rail or network 104A, 104B, 104N, respectively, over which settlement messages are processed. For example, when an ACH payment is settled, that settlement message is processed using a first settlement system 110A, including a separate entry point. An ACH settlement message is received by first settlement system 110A and processed over the first settlement system 110A according to a first settlement protocol. Once settled, first settlement system 110A also has its own recording infrastructure for recording the settlement and identifying where the incoming funds are to be deposited, which product the payment was associated with, which business is attributed the funds, etc. When a payment card payment is settled, in contrast, that settlement message is processed using a completely separate second settlement system 110B, including a separate (second) entry point. A payment card settlement message is received by second settlement system 110B and processed over second settlement system 110B according to a second settlement protocol. Once settled, second settlement system 110B also has its own, separate recording infrastructure.

Additionally, in at least some existing systems, different products are also associated with discrete settlement systems. For example, settlement for a payment made for a life insurance product and paid for using payment method A may be processed across a first settlement system (e.g., settlement system 110A), whereas settlement for a payment made for a home insurance product paid for using payment method A may be processed across a second settlement system (e.g., settlement system 110B). Still further, settlement for a payment made for a home insurance product paid for using payment method B may be processed across a third settlement system (not shown).

In this existing paradigm, whenever a new payment method is offered to consumers to pay for their insurance products, an entirely new settlement system 110N must be developed. The new settlement system 110N may be independent of any existing settlement systems, and requires the development of a new entry point, settlement protocol, and recording infrastructure. In at least some cases, whenever a new product is offered (e.g., a new insurance product, such as airplane insurance), at least one new settlement system 110N may need to be developed.

That is, the existing settlement architecture (e.g., settlement architecture 100) may exhibit numerous and significant technical problems. This architecture is inefficient and resource intensive. Discrete settlement systems must be developed and implemented, and any post-settlement record processing is complex and subject to error, because each system relies on its own recording infrastructure. This architecture is inflexible and difficult to scale horizontally, which presents a significant technical problem as new payment methods are being rapidly developed (e.g., cryptocurrency, peer-to-peer payment systems, etc.) and new products are being offered to—and purchased by—consumers. These existing systems may be very coupled due to the complex network of input/output components or devices, which make them more difficult to maintain or update and more prone to unintended breakage. At least some existing systems are batch-based and only able to operate on a fixed schedule.

Embodiments of the present disclosure provide a modular settlement distribution architecture that addresses and overcomes at least these technical problems. In particular, the modular settlement distribution architecture may include a resource routing (RR) computing device, a plurality of parallel settlement routes downstream of the RR computing device, and at least one reporting database. The RR computing device is in network communication with the settlement routes. The reporting database is accessible to the RR computing device as well as to the computing device associated with each of the settlement routes.

The RR computing device may include, in one exemplary embodiment, a settlement bus and a settlement engine. In some embodiments, the settlement bus and settlement engine are different processing components within a same computing device; in other embodiments, the settlement bus and settlement engine represent different computing devices that are networked together. In still other embodiments, the settlement bus and settlement engine may be different processing modules within a same processing component. Each device, processing component, or module may be partitioned from the other and specially programmed to function as described herein.

In an exemplary embodiment, the settlement bus may be configured to receive messages from a payment gateway. The payment gateway may represent a single message source or a plurality of message sources upstream of the RR computing device. These messages are representative of payments made by consumers, to purchase products, where such payments require settlement. These messages, referred to broadly as initiation messages, may include transaction messages processed using a corresponding resource channel, copies of transaction messages, or representations of transaction messages that have been generated by the respective message source.

The settlement bus may be configured to receive, interpret, and process initiation messages associated with payments made using any resource channel and with any type of product. The settlement bus may therefore be referred to as product- and channel-agnostic. Each initiation message may include, among other data elements, a transaction identifier (TID) of a corresponding payment made by the consumer as well as a product code corresponding to the product being paid for. The product code may identify the product (e.g., a home insurance policy) or a department (e.g., a home insurance department), such that the payment made by the consumer can be attributed to the correct department of the business. Where a plurality of transactions are to be settled concurrently (e.g., at the end of a business day), the initiation message may include respective details for each transaction, such as the TID, product code, etc.

In some embodiments, the settlement bus may be configured to process a header of the initiation message to identify or determine a location of one or more TID data field(s) within a body or payload of the initiation message. The settlement bus may be configured to parse the initiation message for the TID data element(s) within the TID data field(s). In some embodiments, the settlement bus may identify one or more other data fields within the initiation message and parse the initiation message for the data element(s) in those data field(s), as applicable. In some embodiments, the settlement bus may be configured to process the header of the initiation message to identify or determine a location of one or more product code data fields within the body or payload of the initiation message. The settlement bus may be configured to parse the initiation message for the product code data element(s) within the product code data field(s).

In an exemplary embodiment, the settlement bus transmits the TID(s) to the settlement engine. The settlement bus may transmit additional data elements to the settlement engine corresponding to each transaction being settled, such as the product code. The transmission of data between the settlement bus and the settlement engine may be referred to herein as "execution" or "initialization" of the settlement engine because the settlement engine is configured to perform various functions in response to receipt of the TID(s).

In particular, the settlement engine, also product- and channel-agnostic, may be configured to query a remote data aggregator using the TID(s). Each query returns information associated with the payment transaction identified by the respective TID. In particular, the query returns a resource channel indicator, which identifies which resource channel (or payment method) was used by the corresponding consumer to initiate the payment for the product, as well as a settlement amount associated with the completed transaction. As described further herein, the resource channel indicator may serve as a persistent flag throughout subsequent messaging, to at least partially control routing of settlement distribution messages.

The query also returns, based upon the TID, data elements occupying a limited set of data fields. The limited set of data fields is defined based upon the resource channel indicator and serves to limit the amount of sensitive data transmitted between parties of the modular settlement distribution architecture. That is, the limited set of data fields is selected to provide a minimum number of corresponding data elements that will enable the settlement to be accurately processed.

In an exemplary embodiment, the limited set of data fields includes a source identifier and a destination identifier. In some embodiments, the source identifier and/or the destination identifier may be different data fields depending upon the resource channel type. For example, where the resource channel indicator identifies the resource channel for the payment transaction as ACH, the limited set of data fields may include a payor account number (source identifier) and a payee account number (destination identifier), or masked/encrypted versions thereof. Where the resource channel indicator identifies the resource channel for the payment transaction as a credit card, the limited data fields may include a payment card number (source identifier) and a merchant identifier (destination identifier), or masked/encrypted versions thereof. In some embodiments, one or more data elements in this limited set of data fields may serve to identify the product being paid for and/or the department to which the payment should be attributed, in addition to or in lieu of a product code.

In some embodiments, the settlement engine may make a single query to the remote data aggregator for each TID and may receive, in response to the single query, the resource channel indicator, the settlement amount, and the data elements corresponding to the limited set of data fields (also referred to herein as a "limited set of data elements") for the respective transaction. In such cases, the remote data aggregator may access a set of rules that define the limited set of data fields associated with the resource channel indicator. In other embodiments, the settlement engine may make a first query to the remote data aggregator with a TID and may receive, in response to the first query, the resource channel indicator and the settlement amount associated with the respective transaction. The settlement engine may then use the resource channel indicator to identify the limited set of data fields, and may make a second query to the remote data aggregator for the data elements corresponding to the limited set of data fields. The settlement engine may receive, in response to the second query, the limited set of data elements for the respective transaction. In such cases, the settlement engine may access a set of rules that define the limited set of data fields based upon the resource channel indicator. In some embodiments, the settlement engine may make a separate query for each TID (that is, for each transaction identified in the initiation message). In other embodiments, the settlement engine may make a query including more than one TID, and may receive information from the remote data aggregator in a response structure that indexes data elements according to TID.

The settlement engine may access a modular distribution message template. The modular distribution message template may be stored in a local memory device accessible by the settlement engine, a memory of the RR computing device, or a remote database. The modular distribution message template is a modular template that enables the settlement engine to construct settlement distribution messages ("distribution messages") based upon the resource channel type corresponding to the payment transaction(s), as identified by the resource channel indicator. Similar to the definition of the limited set of data fields described above, the data fields of the distribution message body may be related to the type of resource channel used to make the payment transaction and may serve to limit the amount of sensitive data transmitted between parties of the modular settlement distribution architecture. That is, the data fields of the distribution message are selected to provide a minimum number of corresponding data elements that will enable the settlement to be accurately processed, in turn minimizing a size of the message being transmitted.

Using the TID and the corresponding data elements accessed from the remote data aggregator, the settlement engine may populate the modular distribution message template to generate a distribution message. For example, the settlement engine may populate data fields of the modular distribution message template that correspond to the limited set of data fields queried at the remote data aggregator. The settlement engine may populate part of the template with the TID, the resource channel indicator, the product code, the settlement amount, and the limited set of data elements, respectively, for each transaction. The template may include instructions for formatting the distribution message, based upon communication protocols or standards of a corresponding settlement route. The resulting data structure generated by the settlement engine is the distribution message. The distribution message may have a first portion thereof that has a standard format, regardless of the intended recipient, which is pre-defined by the template. The first portion may include a message header and a portion of the message payload. The distribution message may also have a second portion that includes the limited set of data elements (or a subset thereof). In this way, in some embodiments, regardless of the recipient of the distribution message, the recipient device may process the distribution message and access the data fields used to perform settlement.

In some embodiments, the transactions identified in the initiation message may include transactions made over different resource channels. For example, a subset of the transactions may be ACH transactions and another subset may be debit card transactions. In some such embodiments, the settlement engine is configured to generate a plurality of distribution messages, each distribution message including a subset of the transactions that share a same resource channel indicator. Continuing with the above example, the settlement engine may generate a first distribution message according to an ACH resource channel indicator, the first distribution message including transaction details of only the ACH transaction(s). The settlement engine may also generate a second distribution message according to a debit card resource channel indicator, the second distribution message including transaction details of only the debit card transaction(s).

The settlement engine uses the resource channel indicator to identify which settlement route, of the plurality of settlement routes downstream of the RR computing device, to route a particular distribution message to. As described herein, the resource channel indicator identifies the type of resource channel (payment method) used in the payment transaction initiated by the consumer. The type of resource channel determines which settlement route to use. Therefore, based upon the resource channel indicator, the settlement engine may route the distribution message to a corresponding one of the plurality of settlement routes. In some embodiments, this data transmission may be facilitated using an API connection between the RR computing device and one or more computing devices of the corresponding settlement route. In some embodiments, the settlement engine, in generating the distribution message, may format the message according to pre-established messaging protocols or standards associated with the particular settlement route. In such embodiments, the settlement engine may route the formatted distribution message accordingly.

In the exemplary embodiment, the settlement engine can be considered an input node to the settlement routes. That is, each distribution message is routed to one of the downstream settlement routes by the settlement engine. Advantageously, therefore, the infrastructure of the modular settlement distribution architecture is simplified (in comparison to some known settlement architectures, such as architecture 100, shown in FIG. 1).

The settlement routes may be configured to complete the funds settlement as instructed, according to the received distribution message. Once the settlement processes performed by any settlement route are completed, that settlement route transmits a confirmation message to the RR computing device. In some embodiments, the confirmation message is formatted as a copy of the settlement message along with an indicator that the funds settlement is complete and successful. In some embodiments, the confirmation message may also include one or more additional data elements associated with the completed settlement. In some embodiments, these additional data elements may include the same data elements transmitted to the settlement route in the distribution message (or copies thereof), such as the source identifier, destination identifier, product code, settlement amount, TID, etc. In some embodiments, the data elements may be indexed according to TID, or the data elements may be indexed according to product code. Additionally or alternatively, these data elements may include transaction details generated during settlement. The settlement route may also generate and/or transmit (to the RR computing device) a transaction record.

The RR computing device further includes a distribution and reporting (DR) module, which may be configured to receive and process incoming confirmation messages from any settlement route of the plurality of settlement routes. In an exemplary embodiment, the DR module may be configured to parse the confirmation message for the source identifier, destination identifier, and product code for each settled transaction identified in the confirmation message (which may be one or more transactions), as well as a settlement amount of funds settled in response to the distribution message.

The DR module may be configured to generate one or more distribution records and to write each distribution record to a memory, such as a reporting database. The distribution record includes a data field for storing a value representing an amount of funds attributable to each product or department, as identified by the product code(s) in the confirmation message. The DR module may be configured to generate a distribution record corresponding to each transaction and/or corresponding to each received confirmation message. In further embodiments, the DR module may be configured to generate a distribution record corresponding to each product code. Once each distribution record is stored in the reporting database (e.g., written to a memory), these records can be accessed for various financial reporting functions within a business, or for other analyses. In some embodiments, the distribution records are stored internally on the RR computing device (e.g., in one or more internal memory devices), whereas in other embodiments, the distribution records are stored in a centralized reporting database that is separate from the RR computing device.

In some embodiments, the DR module may be further configured to initiate or cause a funds distribution or transfer between departments within a business, depending on the information in the received confirmation message. That is, in certain embodiments, where the RR computing device is integral to a particular business, the DR module may be configured to manage funds distribution or transfer between accounts associated with the business.

In the example embodiment, the DR module can be considered an output node from the settlement routes. That is, each confirmation message from any settlement route is transmitted to the DR module. Advantageously, therefore, the infrastructure of the modular settlement distribution architecture is simplified (in comparison to some known settlement architectures, such as architecture 100, shown in FIG. 1). In some embodiments, the DR module is a separate processing component within a same computing device as the settlement bus and/or settlement engine. In some embodiments, the DR module may be separate from the RR computing device, and may be considered a DR computing device that is independently operable to perform the functions described herein. In still other embodiments, the DR module may be a different processing module within a same processing component of the RR computing device as, for example, the settlement bus and/or settlement engine. Each device, processing component, or module may be partitioned from the other and specially programmed to function as described herein.

Each of the settlement routes may be a different message processing network or set of infrastructure. Settlement routes may accordingly be operated by different entities or function differently from one another. In the context of the present disclosure, the particular operation of individual settlement routes is not relevant, because each settlement route is communicatively coupled to the RR computing device and receives distribution messages via the settlement engine (e.g., as an input node to each settlement route) and transmits confirmation messages via the DR module (e.g., as an output node from each settlement route). Therefore, as described herein, the settlement routes can operate independently and without any infrastructure changes thereto. Rather, any changes to distribution messages can be made at the singular settlement engine, to operate with any existing, updated, or new settlement route. Likewise, any changes to reporting can be made at the singular DR module, to operate with any existing, updated, or new settlement route.

As explained herein, new resource channels may become available to consumers at any time, and consumers may wish to pay for their products using these new resource channels. Using the modular settlement distribution architecture of the present disclosure, any settlement route(s) for corresponding new resource channel(s) may be readily added and implemented. Rather than generating an entirely new operating infrastructure for the new resource channel, as is done in at least some existing settlement systems (e.g., the settlement architecture 100, shown in FIG. 1), the input node and output node of the modular settlement distribution architecture may process updated instructions to manage and facilitate messaging with the new settlement route.

In the example embodiment, when a new settlement route is established, a new set of rules may be defined and stored in the RR computing device for access by the settlement engine. In particular, the rules define the limited set of data fields that the settlement engine will query the remote data aggregator for, or the minimal number and type of data elements needed to initiate settlement over the settlement route. The settlement engine may also update the modular distribution message template such that the corresponding data fields can be populated and the message can be appropriately formatted. The network connection between the settlement engine (e.g., the existing input node) and the new settlement route may be established and routing to the new settlement route may be readily operational.

Additionally, when the new settlement route is established, a new set of rules may be defined and stored in the RR computing device for access by the DR module. For example, the rules define how to interpret incoming confirmation messages from the new settlement route for generation and storage of distribution records in a same format as existing records. The network connection between the settlement route and the DR module (e.g., the existing output node) may be established and messaging from the new settlement route may be readily operational.

At least one of the technical problems addressed by this system may include: (i) difficulty in set-up and scaling of existing settlement architecture; (ii) difficulty with or inability to incorporate new payment methods into existing settlement architectures; (iii) difficulty with or inability to incorporate new products with payments made into existing settlement architectures; and (iv) non-standardized operation between various settlement routes based upon payment methods and/or products.

The modular settlement distribution architecture of the present disclosure may provide technical solutions to at least these technical problems. This architecture may improve incorporating a settlement route (sometimes referred to as a payment rail), such that it may be more efficient and less complex and may require fewer computing resources (e.g., processing, memory). In particular, the settlement routes are incorporated in a modular manner, where the settlement route is not tied to the actual product being paid for and is modularly couplable/decouplable from the input and output nodes. Accordingly, there is no impact to downstream or upstream consumers. Moreover, the modular settlement distribution architecture may be configured to handle individual files or settlement messages in an asynchronous manner, without requiring batch files and/or fixed schedules for processing.

The technical effects may be achieved by performing at least one of the following steps: 1) receiving an initiation message including a transaction identifier (TID) and a product code associated with a completed transaction; 2) in response to receiving the initiation message, executing a settlement engine having access to a modular distribution message template; 3) querying, by the settlement engine, a remote data aggregator using the TID, to cause the remote data aggregator to return a resource channel indicator, indicating a type of a resource channel used in the completed transaction, and limited data elements that are associated with the resource channel type; 4) based on the resource channel indicator, populating, by the settlement engine, the modular distribution message template with the TID, the product code, and the limited data elements to generate a distribution message; and/or 5) based on the resource channel indicator, routing, by the settlement engine, the distribution message to a corresponding one of the plurality of settlement routes.

The technical effects may additionally or alternatively be achieved by performing at least one of the following steps: a) receiving, from the settlement route, a confirmation message; b) generating a distribution record corresponding to the confirmation message; c) writing the distribution record to a reporting database; d) communicatively connecting the new settlement route to the settlement engine at an input node; e) communicatively connecting the new settlement route to a distribution and reporting (DR) module at an output node; f) receiving a second initiation message including a second TID and a second product code associated with a second completed transaction; g) in response to receiving the second initiation message, executing the settlement engine; h) querying, by the settlement engine, the remote data aggregator using the second TID, to cause the remote data aggregator to return a second resource channel indicator, indicating a different type of a resource channel used in the second completed transaction, and different limited data elements that are associated with the different resource channel type; i) based on the second resource channel indicator, populating, by the settlement engine, the modular distribution message template with the second TID, the second product code, and the different limited data elements to generate a second distribution message; j) based on the second resource channel indicator, routing, by the settlement engine, the distribution message to a corresponding second settlement route of the plurality of settlement routes, the second settlement route different from the first settlement route; and/or k) querying the remote data aggregator using each of the TIDs associated with each of a plurality of completed transactions, to cause the remote data aggregator to return a respective resource channel indicator associated with each of the plurality of completed transactions.

Exemplary Modular Settlement Distribution Architecture

Figure 2:
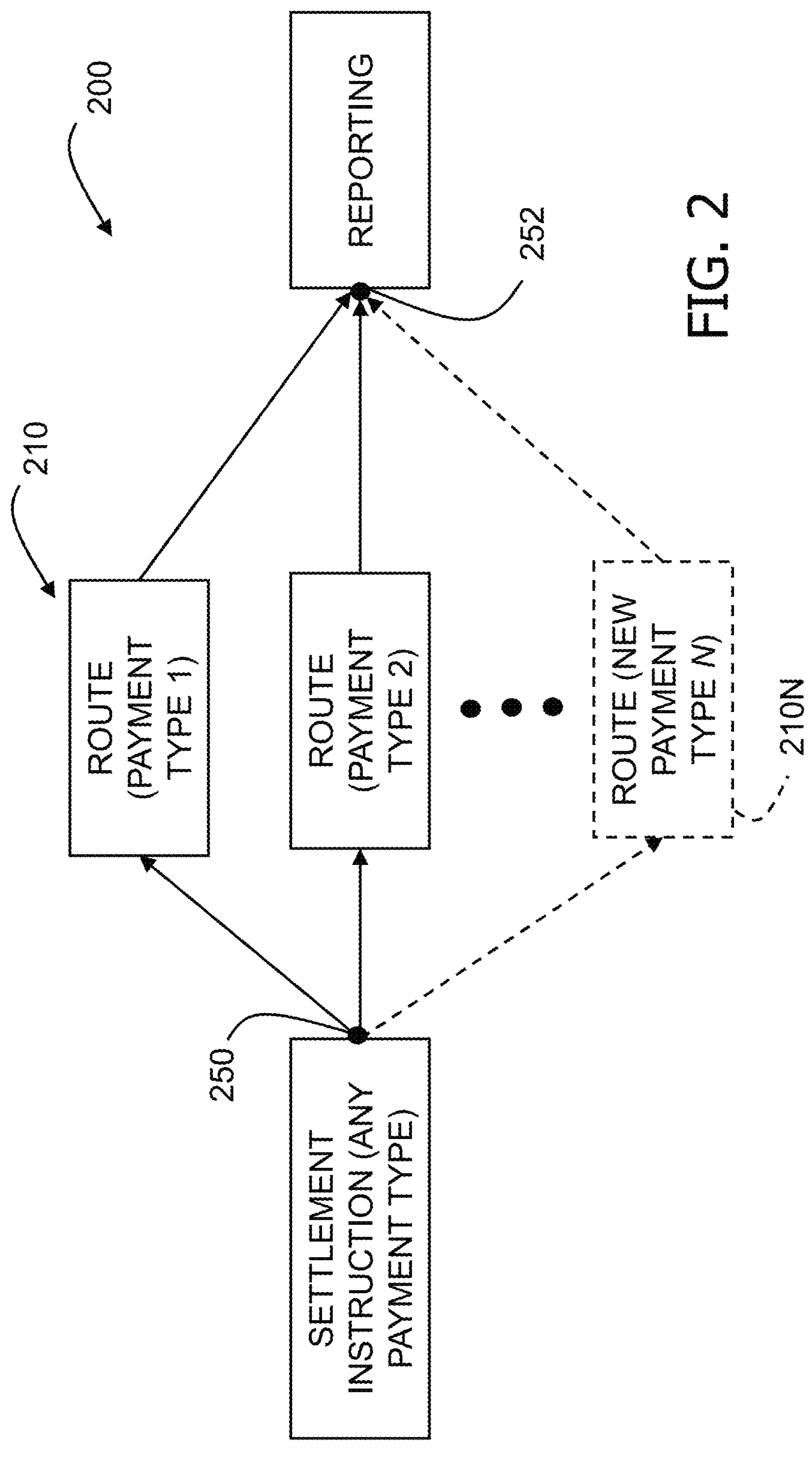
FIG. 2 is a schematic dataflow of an exemplary modular settlement distribution architecture, in accordance with the present disclosure.
Figure 3:
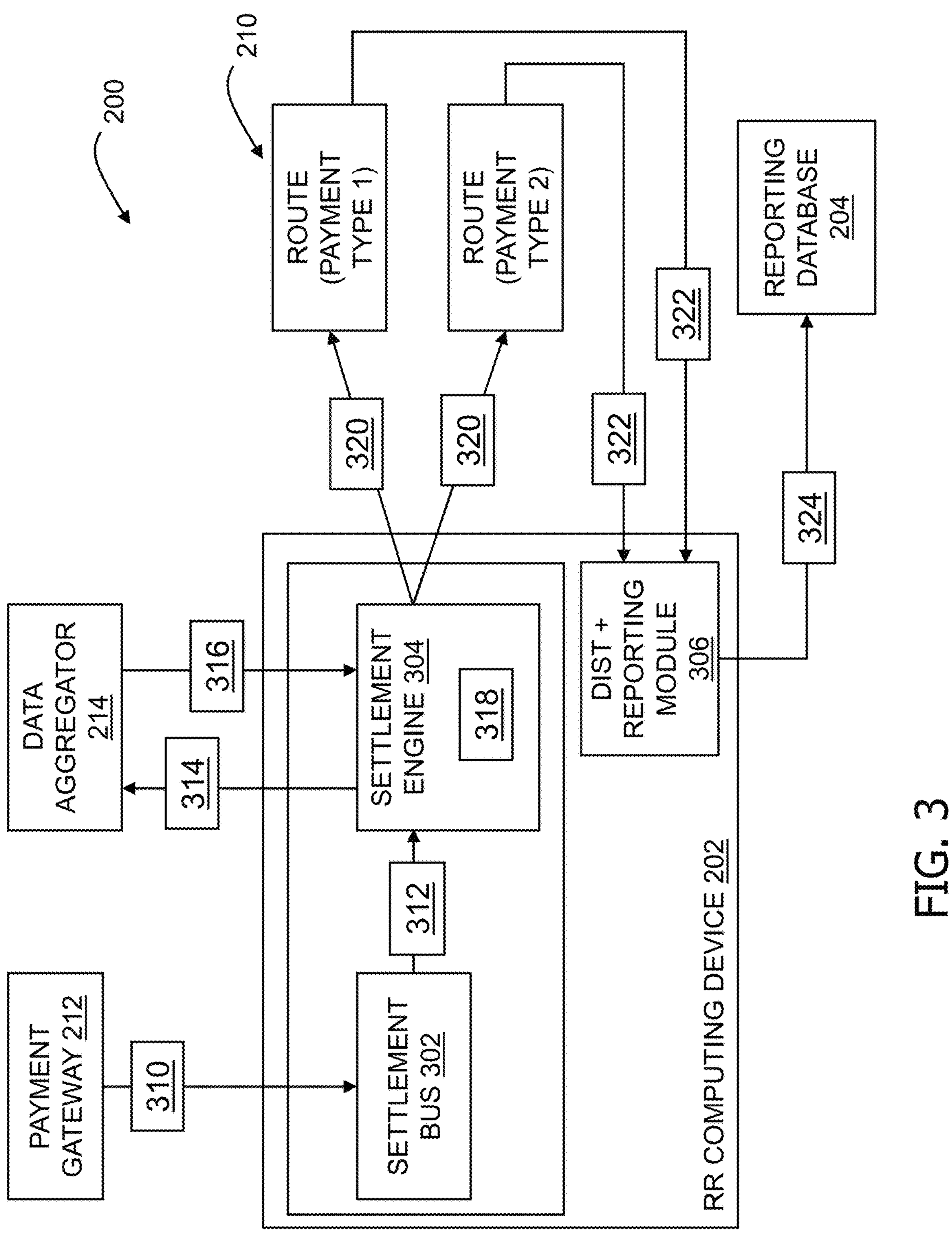
FIG. 3 is a schematic diagram of the exemplary modular settlement distribution architecture, including a resource routing (RR) computing device.

FIG. 2 is a schematic dataflow of an example modular settlement distribution architecture 200, in accordance with the present disclosure. FIG. 3 is another schematic diagram of modular settlement distribution architecture 200, including a resource routing (RR) computing device 202.

In an exemplary embodiment, modular settlement distribution architecture 200 may be a computing system for implementing settlement distribution messaging across multiple settlement routes, in a manner that is both resource channel- and product-agnostic. Specifically, as illustrated in FIG. 2, settlement instructions are transmitted from an input node 250 to any of settlement routes 210, and messaging from any settlement route 210 is received at an output node 252, where relevant data is collected and written to memory.

With reference to FIG. 3, architecture 200 includes at least one resource routing (RR) computing device 202. RR computing device 202 includes at least a settlement bus 302, a settlement engine 304, and a distribution and reporting (DR) module 306. In addition, architecture 200 may include one or more centralized reporting databases 204.

Architecture 200 also includes a plurality of parallel settlement routes 210 that operate independently of one another and that are in network communication with RR computing device 202. In one exemplary embodiment, RR computing device 202 may be modularly coupled to and in network communication with the plurality of settlement routes 210, such that RR computing device 202 is the same input node 250 (shown in FIG. 2) to each of the plurality of settlement routes 210 and/or is a same output node 252 (also shown in FIG. 2) from each of the plurality of settlement routes 210.

RR computing device 202 may be further in network communication with a payment gateway 212 and a remote data aggregator 214. Payment gateway 212 may represent a single message source or a plurality of message sources upstream of RR computing device 202. Payment gateway 212 and/or remote data aggregator 214 may be associated with RR computing device 202 (e.g., incorporated into a same business as RR computing device 202) or may be associated with any other party/parties or entity/entities.

In an exemplary embodiment, RR computing device 202 may be configured to receive initiation messages 310 from payment gateway 212, for example, via settlement bus 302. Initiation messages 310 are representative of payments made by consumers, to purchase products, where such payments require settlement and may include transaction messages processed using a corresponding resource channel, copies of transaction messages, or representations of transaction messages that have been generated by the respective message source (e.g., payment gateway 212). Settlement bus 302 may be configured to receive, interpret, and process initiation messages 310 associated with payments made using any resource channel and with any type of product.

Each initiation message 310 may include, among other data elements, a transaction identifier (TID) of a corresponding payment made by the consumer as well as a product code corresponding to the product being paid for. The product code may identify the product (e.g., a home insurance policy) or a department (e.g., a home insurance department), such that the payment made by the consumer can be attributed to the correct department of the business. Where a plurality of transactions are to be settled concurrently (e.g., at the end of a business day), initiation message 310 may include respective details for each transaction, such as the TID, product code, etc.

In some embodiments, settlement bus 302 may be configured to process a header of initiation message 310 to identify or determine a location of one or more TID data field(s) within a body or payload of initiation message 310. Settlement bus 302 may be configured to parse initiation message 310 for the TID data element(s) within the TID data field(s). In some embodiments, settlement bus 302 may identify one or more other data fields within initiation message 310 and parse initiation message 310 for the data element(s) in those data field(s), as applicable. In some embodiments, settlement bus 302 may be configured to process the header of initiation message 310 to identify or determine a location of one or more product code data fields within the body or payload of initiation message 310. Settlement bus 302 may be further configured to parse initiation message 310 for the product code data element(s) within the product code data field(s).

In an exemplary embodiment, settlement bus 302 transmits a data package 312 to settlement engine 304. Data package 312 may include the TID(s) parsed from initiation messages 310. Data package 312 may include data elements corresponding to each transaction being settled, such as the product code. The transmission of data package 312 between settlement bus 302 and settlement engine 304 may be referred to herein as "execution" or "initialization" of settlement engine 312, because settlement engine 304 is configured to perform various functions in response to receipt of data package 312.

In particular, in response to receiving data package 312, settlement engine 304, may be configured to query remote data aggregator 214 using data parsed from data package 312. In one exemplary embodiment, settlement engine 304 transmits a query 314 to remote data aggregator 214, query 314 including the TID(s). Each query 314 to remote data aggregator 214 may cause remote data aggregator 214 to return a query response 316, which includes information associated with the payment transaction identified by the respective TID. In particular, query response 316 may include a resource channel indicator, which identifies which resource channel (or payment method) was used by the corresponding consumer to initiate the payment for the product, as well as a settlement amount associated with the transaction. As described further herein, the resource channel indicator may serve as a persistent flag throughout subsequent messaging, to at least partially control routing of distribution messages 320 (as described further herein).

Query response 316 may also include, based upon the TID, data elements occupying a limited set of data fields. The limited set of data fields may be defined based upon the resource channel indicator and may serve to limit the amount of data transmitted between parties of modular settlement distribution architecture 200 (e.g., between remote data aggregator 214 and settlement engine 304, between settlement engine 304 and settlement routes 210, etc.). That is, the limited set of data fields is selected to provide a minimum number of corresponding data elements that will enable the settlement to be accurately processed. Moreover, the limited set of data fields is limited to maintain security of sensitive information, such that query response 316 does not include extraneous sensitive or personally identifiable information.

In an exemplary embodiment, the limited set of data fields includes a source identifier and a destination identifier. In some embodiments, the source identifier and/or the destination identifier may be different data fields depending upon the resource channel type. For example, where the resource channel indicator identifies the resource channel for the payment transaction as ACH, the limited set of data fields may include a payor account number (source identifier) and a payee account number (destination identifier), or masked/encrypted versions thereof. Where the resource channel indicator identifies the resource channel for the payment transaction as a credit card, the limited data fields may include a payment card number (source identifier) and a merchant identifier (destination identifier), or masked/encrypted versions thereof. In some embodiments, one or more data elements in this limited set of data fields may serve to identify the product being paid for and/or the department to which the payment should be attributed, in addition to or in lieu of a product code.

In some embodiments, settlement engine 304 may transmit a single query 314 to remote data aggregator 214 for each TID and may receive, in response to the single query 314, a single query response 316 including the resource channel indicator, transaction amount(s) for each transaction and/or a total settlement amount, and the data elements corresponding to the limited set of data fields (also referred to herein as a "limited set of data elements") for the respective transaction. In such cases, remote data aggregator 214 may access a set of rules that define the limited set of data fields associated with the resource channel indicator retrieved in response to query 314.

In other embodiments, settlement engine 304 may transmit a first query 314 to remote data aggregator 314 with a TID and may receive, in response to first query 314, the resource channel indicator and the transaction amount for the respective transaction. Settlement engine 304 may then use the resource channel indicator to identify the limited set of data fields, and may make a second query 314 to remote data aggregator 214 for the data elements corresponding to the limited set of data fields. Settlement engine 304 may receive, in response to second query 314, the limited set of data elements for the respective transaction. In such cases, settlement engine 304 may access a set of rules that define the limited set of data fields based upon the resource channel indicator.

In some embodiments, where multiple transactions are identified in initiation message 310, settlement engine 304 may transmit a separate query 314 for each TID. Remote data aggregator 214 may transmit a query response 316 responsive to each query 314. In other embodiments, settlement engine 304 may transmit a query 314 including more than one TID, and may receive from remote data aggregator 214 a query response 316 that indexes data elements according to TID.

Settlement engine 304 may access a modular distribution message template 318. Modular distribution message template 304 may be stored in a local memory device accessible by settlement engine 304, a memory of RR computing device 202, or a remote database (e.g., reporting database 204). Modular distribution message template 304 may be a modular template that enables settlement engine 204 to construct settlement distribution messages ("distribution messages") 320 based upon the resource channel type corresponding to the payment transaction(s), as identified by the resource channel indicator. Similar to the definition of the limited set of data fields described above, the data fields of the body of distribution message 320 may be related to the type of resource channel used to make the payment transaction and may serve to limit the amount of sensitive data transmitted between parties of modular settlement distribution architecture 200. That is, the data fields of distribution message 320 may be selected to provide a minimum number of corresponding data elements that will enable the settlement to be accurately processed, in turn minimizing a size of distribution message(s) 320 being transmitted to settlement route(s) 210.

Using the TID and the corresponding data elements received or otherwise accessed from remote data aggregator 214, the settlement engine may populate modular distribution message template 318 to generate a distribution message 320. For example, settlement engine 304 may populate data fields of modular distribution message template 318 that correspond to the limited set of data fields queried at remote data aggregator 314. Settlement engine 302 may populate part of modular distribution message template 318 with the TID, the resource channel indicator, the product code, the settlement amount, and the limited set of data elements, respectively, for each transaction. Modular distribution message template 318 may also include instructions for formatting distribution message 320, based upon communication protocols or standards of a corresponding settlement route 310. The resulting data structure generated by settlement engine 304 is distribution message 320. Distribution message 320 may have a first portion thereof that has a standard format, regardless of the intended recipient, which is pre-defined by modular distribution message template 318. The first portion may include a message header and a portion of the message payload. Distribution message 320 may also have a second portion that includes the limited set of data elements (or a subset thereof). In this way, in some embodiments, regardless of the recipient of distribution message 320, the recipient device may process distribution message 320 and access the data fields used to perform settlement.

In some embodiments, the transactions identified in initiation message 310 may include transactions made over different resource channels. For example, a subset of the transactions may be ACH transactions and another subset may be debit card transactions. In some such embodiments, settlement engine 304 may be configured to generate a plurality of distribution messages 320, each distribution message 320 including a subset of the transactions that share a same resource channel indicator. Continuing with the above example, settlement engine 304 may generate a first distribution message 320 according to an ACH resource channel indicator, the first distribution message 320 including transaction details of only the ACH transaction(s). Settlement engine 304 may also generate a second distribution message 320 according to a debit card resource channel indicator, the second distribution message 320 including transaction details of only the debit card transaction(s).

Settlement engine 304 uses the resource channel indicator to identify which settlement route 210, of the plurality of settlement routes 210 downstream of RR computing device 102, to route a particular distribution message 320 to. As described herein, the resource channel indicator identifies the type of resource channel (payment method) used in the payment transaction initiated by the consumer. The type of resource channel determines which settlement route 210 to use. Therefore, based upon the resource channel indicator, settlement engine 304 may route distribution message 320 to a corresponding one of the plurality of settlement routes 210. In some embodiments, settlement engine 302, in generating distribution message 320, may format distribution message 320 according to pre-established messaging protocols or standards associated with the particular settlement route 310 (e.g., according to instructions or rules stored in modular distribution message template 318). In such embodiments, settlement engine 304 may route the formatted distribution message 320 accordingly. In some embodiments, data transmission may be facilitated using an API connection between RR computing device 202 and one or more computing devices of the corresponding settlement route 210.

In an exemplary embodiment, input node 250 (shown in FIG. 2) includes RR computing device 202 or, more particularly, settlement engine 304. That is, each distribution message 320 is routed to one of downstream settlement routes 310 by settlement engine 304. Advantageously, therefore, the infrastructure of modular settlement distribution architecture 200 is simplified (in comparison to some known settlement architectures, such as architecture 100, shown in FIG. 1).

Settlement routes 210 may be configured to complete the funds settlement as instructed, according to the received distribution message 320. Once the settlement processes performed by any settlement route 210 are completed, that settlement route 210 may transmit a confirmation message 322 to RR computing device 202. Specifically, RR computing device 202 may further include distribution and reporting (DR) module 306, which may be configured to receive and process incoming confirmation messages 322 from any settlement route 210 of the plurality of settlement routes 310.

Each confirmation message 322 may include an indicator that the funds settlement was successful, as well as additional data elements associated with the completed settlement. In some embodiments, these additional data elements may include the same data elements transmitted to settlement route 210 in settlement message 320 (or copies thereof), such as the source identifier, destination identifier, product code, settlement amount, TID, etc. In this way, confirmation message 322 may be validated by comparison of one or more data elements in confirmation message 322 to one or more data elements in settlement message 320. In some embodiments, the data elements of confirmation message 322 may be indexed according to TID, or the data elements may be indexed according to product code. Additionally or alternatively, these data elements may include transaction details generated during settlement. In an exemplary embodiment, DR module 306 may be configured to parse confirmation message(s) 322 for the source identifier, destination identifier, and product code for each settled transaction identified in confirmation message 322 (which may be one or more transactions), and/or a settlement amount of funds settled between the source and destination in response to distribution message 320.

DR module 306 may be configured to generate one or more distribution records 324 and to write each distribution record 324 to a memory, such as reporting database 204. Distribution record 314 includes a data field for storing a value representing an amount of funds attributable to each product or department, as identified by the product code(s) in confirmation message 322. DR module 306 may be configured to generate a distribution record 324 corresponding to each transaction and/or corresponding to each received confirmation message 322. In further embodiments, DR module 306 may be configured to generate a distribution record 324 corresponding to each product code. Once each distribution record 324 is stored in reporting database 204 (e.g., written to a memory), these records 324 can be accessed for various financial reporting functions within a business, or for other analyses. In some embodiments, distribution records 324 are stored internally on RR computing device 202 (e.g., in one or more internal memory devices), whereas in other embodiments, distribution records 324 are stored in centralized reporting database 204 that is separate from RR computing device 202.

In some embodiments, DR module 306 may be further configured to initiate or cause a funds distribution or transfer between departments within a business, depending on the information in the received confirmation message 322. That is, in certain embodiments, such as where RR computing device 202 is integral to a particular business, DR module 306 may be configured to manage funds distribution or transfer between accounts associated with the business.

In an exemplary embodiment, output node 252 (shown in FIG. 2) may include DR module 306. That is, each confirmation message 322 from any settlement route 210 is transmitted to DR module 306. Advantageously, therefore, the infrastructure of modular settlement distribution architecture 200 is simplified (in comparison to some known settlement architectures, such as architecture 100, shown in FIG. 1). In some embodiments, DR module 306 is a separate processing component within a same computing device as settlement bus 302 and/or settlement engine 304. In some embodiments, DR module 306 may be separate from RR computing device 202, and may be considered a DR computing device that is independently operable to perform the functions described herein. In still other embodiments, DR module 306 may be a different processing module within a same processing component of RR computing device 202 as, for example, settlement bus 302 and/or settlement engine 304. Each device, processing component, or module may be partitioned from the other and specially programmed to function as described herein.

Each of settlement routes 210 may be a different message processing network or set of infrastructure. Settlement routes 210 may accordingly be operated by different entities or function differently from one another. In the context of the present disclosure, the particular operation of individual settlement routes 210 is not relevant, because each settlement route 210 is communicatively coupled to RR computing device 202 and receives settlement messages 320 via settlement engine 304 (e.g., functioning as input node 250 to each settlement route 210) and transmits confirmation messages 322 to DR module 106 (e.g., functioning as output node 252 from each settlement route 210). Therefore, as described herein, settlement routes 210 can operate independently and without any significant infrastructure changes thereto. Rather, any changes to settlement messages 320 can be made at the singular settlement engine 304, to operate with any existing, updated, or new settlement route 210. Likewise, any changes to reporting can be made at singular DR module 306, to operate with any existing, updated, or new settlement route 210.

As explained herein, new resource channels may become available to consumers at any time, and consumers may wish to pay for their products using these new resource channels. Using modular settlement distribution architecture 200 of the present disclosure, any settlement route(s) 210 for corresponding new resource channel(s) may be readily added and implemented. Rather than generating an entirely new operating infrastructure for the new resource channel, as is done in at least some existing settlement systems (e.g., the settlement architecture 100, shown in FIG. 1), input node 250 and output node 252 of modular settlement distribution architecture 200 may process updated instructions to manage and facilitate messaging with the new settlement route 210, illustrated as settlement route 210N in FIG. 2.

In an exemplary embodiment, when new settlement route 210N is established, a new set of rules may be defined and stored in RR computing device 202 for access by settlement engine 304. In particular, the rules define the limited set of data fields that settlement engine 304 will query remote data aggregator 214 for, or the minimal number and type of data elements needed to initiate settlement over new settlement route 210N. Settlement engine 304 may also update modular distribution message template 318 such that the corresponding data fields can be populated and any distribution message 320 transmitted to new settlement route 210N can be appropriately formatted. The network connection between settlement engine 304 (e.g., input node 250) and new settlement route 210N may be established and routing to new settlement route 210N may be readily operational.

Additionally, when new settlement route 210N is established, a new set of rules may be defined and stored in RR computing device 202 for access by DR module 306. For example, the rules define how to interpret incoming confirmation messages 322 from new settlement route 210N for generation and storage of distribution records 324 in a same format as existing records. The network connection between new settlement route 210N and DR module 306 (e.g., output node 252) may be established and receiving messaging from new settlement route 210N may be readily operational.

Figure 4:
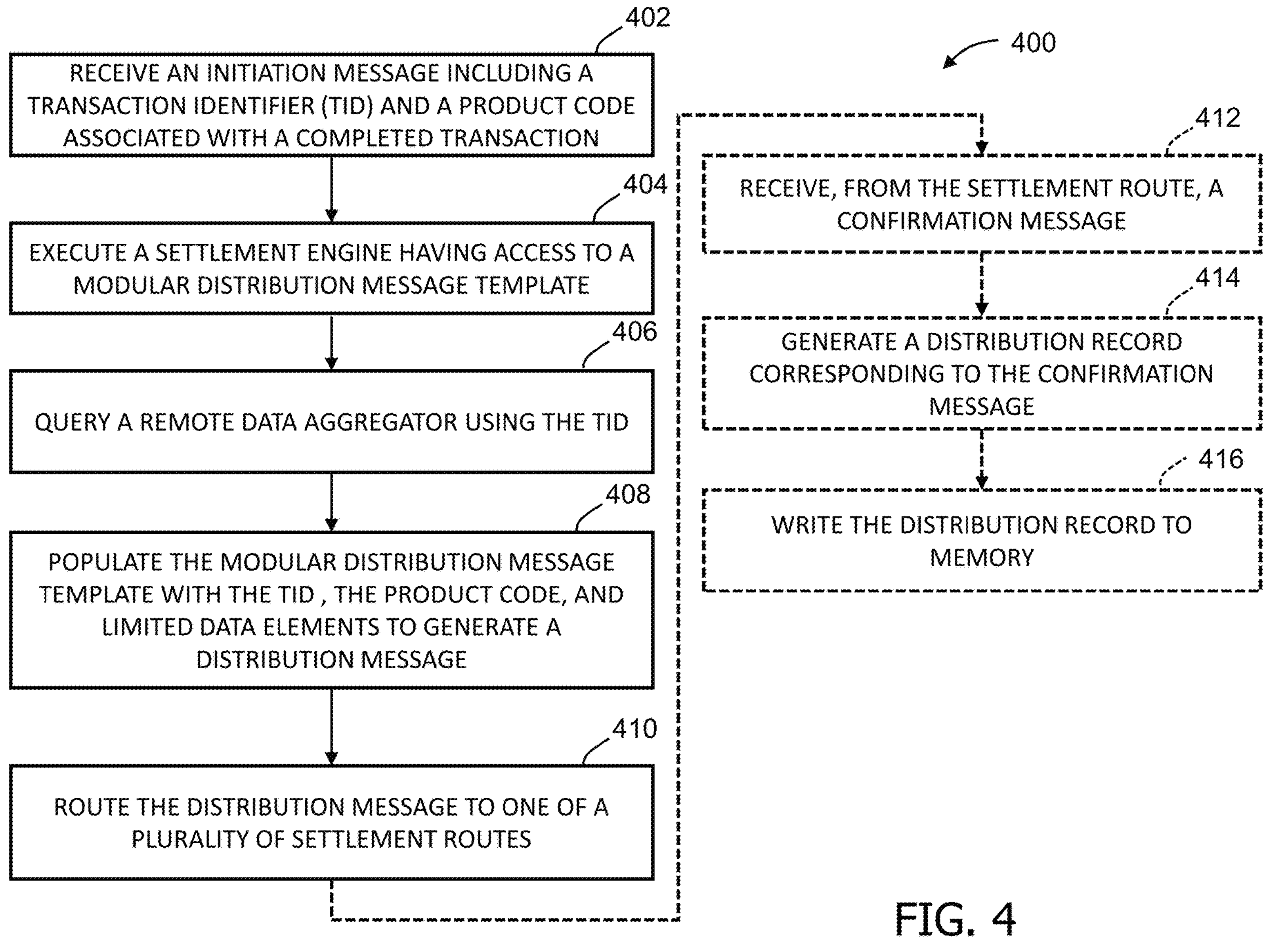
FIG. 4 is a flowchart of an exemplary computer-implemented method that may be implemented using the modular settlement distribution architecture shown in FIG. 2.

Exemplary Computer-Implemented Methods for Routing Settlement Distribution Messages FIG. 4 illustrates a flow chart of an exemplary computer-implemented process 400 for routing settlement distribution messages, using modular settlement distribution architecture 200 (shown in FIG. 2).

Process 400 may be implemented by a computing device, for example RR computing device 202 (shown in FIG. 2). In the exemplary embodiment, process 400 includes receiving 402 an initiation message including a transaction identifier (TID) and a product code associated with a completed transaction. Process 400 further includes executing 404 a settlement engine having access to a modular distribution message template, in response to receiving the initiation message.

Process 400 also includes querying 406 a remote data aggregator using the TID, to cause the remote data aggregator to return a resource channel indicator, indicating a type of a resource channel used in the completed transaction, and limited data elements that are associated with the resource channel type. Further, based on the resource channel indicator, process 400 includes populating 408 the modular distribution message template with the TID, the product code, and the limited data elements to generate a distribution message, and routing 410 the distribution message to a corresponding one of the plurality of settlement routes.

Process 400 may include additional, fewer, and/or alternative steps. In some embodiments, process 400 may further include receiving 412, from the settlement route, a confirmation message, generating 414 a distribution record corresponding to the confirmation message, and/or writing 416 the distribution record to a memory.

In some embodiments, the settlement engine may be an input node to the plurality of settlement routes and a distribution and reporting (DR) of the RR computing device module may be an output node from the plurality of settlement routes. In some such embodiments, a new settlement route may be added to the plurality of settlement routes, and process 400 may further include communicatively connecting the new settlement route to the settlement engine at the input node, and communicatively connecting the new settlement route to the DR module at the output node.

In additional embodiments, the settlement route may be a first settlement route, and process 400 may further include receiving a second initiation message including a second TID and a second product code associated with a second completed transaction and, in response to receiving the second initiation message, executing the settlement engine. Process 400 may further include querying, by the settlement engine, the remote data aggregator using the second TID, to cause the remote data aggregator to return a second resource channel indicator, indicating a different type of a resource channel used in the second completed transaction, and different limited data elements that are associated with the different resource channel type. Process 400 may also include, based on the second resource channel indicator, populating the modular distribution message template with the second TID, the second product code, and the different limited data elements to generate a second distribution message, and routing the distribution message to a corresponding second settlement route of the plurality of settlement routes, the second settlement route different from the first settlement route.

In further embodiments, the initiation message may include a respective TID and product code for each of a plurality of completed transactions including the completed transaction, and process 400 may further include querying the remote data aggregator using each of the TIDs associated with each of the plurality of completed transactions, to cause the remote data aggregator to return a respective resource channel indicator associated with each of the plurality of completed transactions.

Exemplary Server Device

Figure 5:
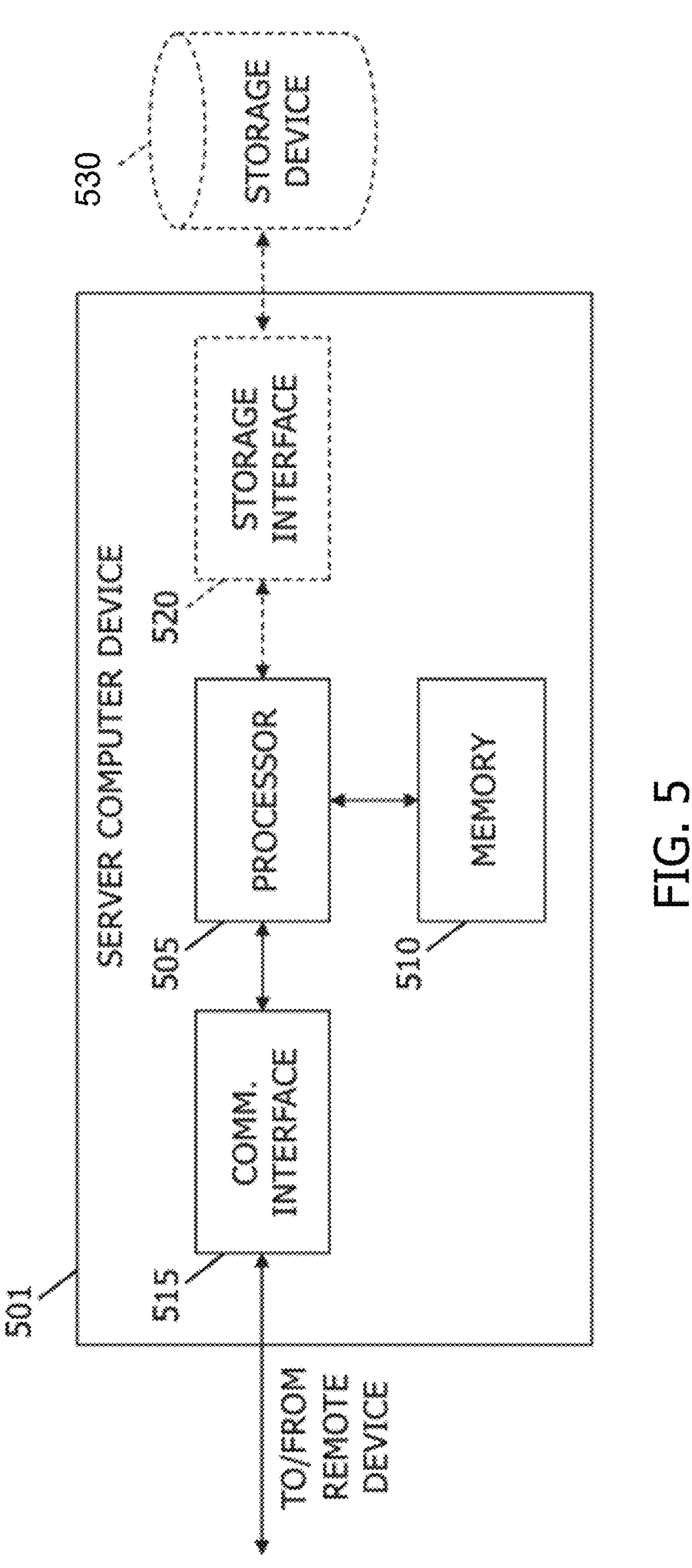
FIG. 5 illustrates an exemplary configuration of a server system that may be used in the modular settlement distribution architecture shown in FIG. 2.

FIG. 5 depicts an exemplary configuration of server computer device 501, in accordance with one embodiment of the present disclosure. Server computer device 501 may include, but is not limited to, RR computing device 202, payment gateway 212, remote data aggregator 214, DR module 306, and/or settlement routes 210 (all shown in FIG. 3). Server computer device 501 may include a processor 505 for executing instructions. Instructions may be stored in a memory area 510. Processor 505 may include one or more processing units (e.g., in a multi-core configuration).

Processor 505 may be operatively coupled to a communication interface 515 such that server computer device 501 is capable of communicating with a remote device. For example, communication interface 515 may receive messages from remote devices via the Internet.

Processor 505 may also be operatively coupled to a storage device 530. Storage device 530 may be any computer-operated hardware suitable for storing and/or retrieving data, such as, but not limited to, data associated with reporting database 204 (shown in FIG. 3). In some embodiments, storage device 530 may be integrated in server computer device 501. For example, server computer device 501 may include one or more hard disk drives as storage device 530. In other embodiments, storage device 530 may be external to server computer device 501 and may be accessed by a plurality of server computer devices 501. For example, storage device 530 may include a storage area network (SAN), a network attached storage (NAS) system, and/or multiple storage units such as hard disks and/or solid-state disks in a redundant array of inexpensive disks (RAID) configuration.

In some embodiments, processor 505 may be operatively coupled to storage device 530 via a storage interface 520. Storage interface 520 may be any component capable of providing processor 505 with access to storage device 530. Storage interface 520 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 505 with access to storage device 530.

Processor 505 may execute computer-executable instructions for implementing aspects of the disclosure. In some embodiments, processor 505 may be transformed into a special purpose microprocessor by executing computer-executable instructions or by otherwise being programmed. For example, processor 505 may be programmed with instructions such as those illustrated in FIG. 4.

Exemplary User Computing Device

Figure 6:
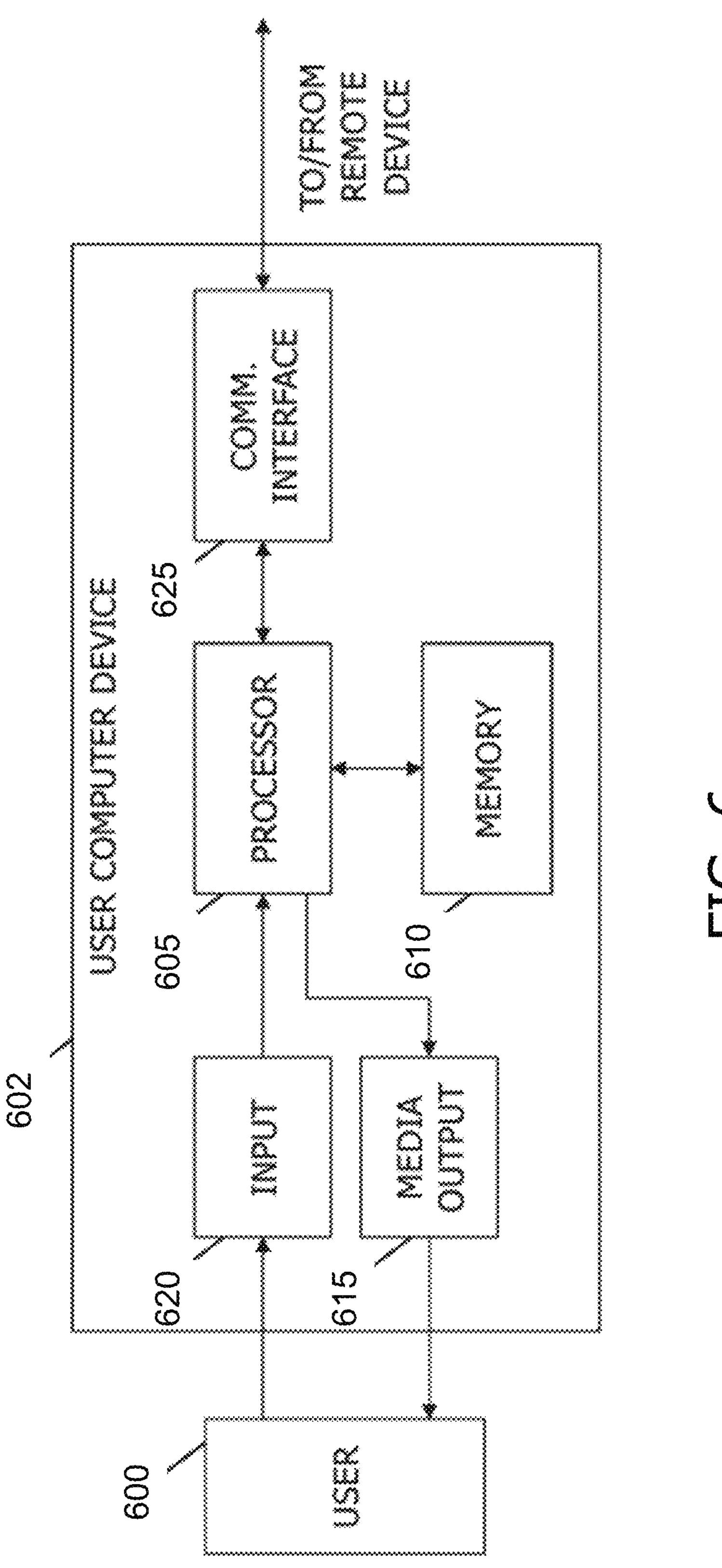
FIG. 6 illustrates an exemplary configuration of a client system that may be used in the modular settlement distribution architecture shown in FIG. 2.

FIG. 6 depicts an exemplary configuration of a user computer device 202 that may be operated by a user 600. User computer device 402 may include, but is not limited to, RR computing device 202, payment gateway 212, data aggregator 214, and/or DR module 306 (all shown in FIG. 3). User computer device 602 may include a processor 605 for executing instructions. In some embodiments, executable instructions are stored in a memory area 610. Processor 605 may include one or more processing units (e.g., in a multi-core configuration). Memory area 610 may be any device allowing information such as executable instructions and/or transaction data to be stored and retrieved. Memory area 610 may include one or more computer readable media.

User computer device 602 may also include at least one media output component 615 for presenting information to user 600. Media output component 615 may be any component capable of conveying information to user 600. In some embodiments, media output component 615 may include an output adapter (not shown) such as a video adapter and/or an audio adapter. An output adapter may be operatively coupled to processor 605 and operatively coupleable to an output device such as a display device (e.g., a cathode ray tube (CRT), liquid crystal display (LCD), light emitting diode (LED) display, or "electronic ink" display), an audio output device (e.g., a speaker or headphones), virtual headsets (e.g., AR (Augmented Reality), VR (Virtual Reality), or XR (extended Reality) headsets).

In some embodiments, media output component 615 may be configured to present a graphical user interface (e.g., a web browser and/or a client application) to user 600. A graphical user interface may include, for example, an interface for displaying information from a distribution record. In some embodiments, user computer device 602 may include an input device 620 for receiving input from user 600. Input device 620 may include, for example, a keyboard, a pointing device, a mouse, a stylus, a touch sensitive panel (e.g., a touch pad or a touch screen), a gyroscope, an accelerometer, a position detector, a biometric input device, and/or an audio input device. A single component such as a touch screen may function as both an output device of media output component 615 and input device 620.

User computer device 602 may also include a communication interface 625, communicatively coupled to a remote device. Communication interface 425 may include, for example, a wired or wireless network adapter and/or a wireless data transceiver for use with a mobile telecommunications network.

Stored in memory area 610 are, for example, computer readable instructions for providing a user interface to user 600 via media output component 615 and, optionally, receiving and processing input from input device 620. A user interface may include, among other possibilities, a web browser and/or a client application.

Processor 605 executes computer-executable instructions for implementing aspects of the disclosure. In some embodiments, processor 605 is transformed into a special purpose microprocessor by executing computer-executable instructions or by otherwise being programmed.

Exemplary Embodiments & Functionality

In one embodiment of the present disclosure, a modular settlement distribution architecture may be provided. The modular settlement distribution architecture may include a reporting database and a resource routing (RR) computing device. The RR computing device may include at least one processor and at least one memory device. The RR computing device may be modularly coupled to and in network communication with a plurality of parallel settlement routes such that the RR computing device is at least one of a same input node to each of the plurality of settlement routes or a same output node from each of the plurality of settlement routes. The at least one processor of the RR computing device may be programmed to: (i) receive an initiation message including a transaction identifier (TID) and a product code associated with a completed transaction; (ii) in response to receiving the initiation message, execute a settlement engine having access to a modular distribution message template; (iii) query, by the settlement engine, a remote data aggregator using the TID, to cause the remote data aggregator to return a resource channel indicator, indicating a type of a resource channel used in the completed transaction, and limited data elements that are associated with the resource channel type; (iv) based on the resource channel indicator, populate, by the settlement engine, the modular distribution message template with the TID, the product code, and the limited data elements to generate a distribution message; and/or (v) based on the resource channel indicator, route, by the settlement engine, the distribution message to a corresponding one of the plurality of settlement routes.

In some aspects, the modular settlement distribution architecture may further include a distribution and reporting (DR) module. The DR module may be programmed to: (i) receive, from the settlement route, a confirmation message; (ii) generate a distribution record corresponding to the confirmation message; and/or (iii) write the distribution record to the reporting database.

In some further aspects, the settlement engine may be the input node to the plurality of settlement routes and the DR module may be the output node from the plurality of settlement routes.

In some still further aspects, a new settlement route may added to the plurality of settlement routes, and the at least one processor may be further programmed to: (a) communicatively connect the new settlement route to the settlement engine at the input node; and/or (b) communicatively connect the new settlement route to the DR module at the output node.

In some aspects, the limited set of data elements is, based upon the resource channel type, a minimum number of corresponding data elements that will enable the distribution message to be accurately processed by the settlement route.

In some additional aspects, the settlement route is a first settlement route, and the at least one processor may be further programmed to: (a) receive a second initiation message including a second TID and a second product code associated with a second completed transaction; (b) in response to receiving the second initiation message, execute the settlement engine; (c) query, by the settlement engine, the remote data aggregator using the second TID, to cause the remote data aggregator to return a second resource channel indicator, indicating a different type of a resource channel used in the second completed transaction, and different limited data elements that are associated with the different resource channel type; (d) based on the second resource channel indicator, populate, by the settlement engine, the modular distribution message template with the second TID, the second product code, and the different limited data elements to generate a second distribution message; and/or (e) based on the second resource channel indicator, route, by the settlement engine, the distribution message to a corresponding second settlement route of the plurality of settlement routes, the second settlement route different from the first settlement route.

In some aspects, the RR computing device may be communicatively coupled to each of the plurality of settlement routes using a separate API connection.

In another aspect of the present disclosure, an computing device including at least one memory and at least one processor communicatively coupled to the at least one memory may be provided. The RR computing device may be modularly coupled to and in network communication with a plurality of parallel settlement routes such that the RR computing device is at least one of a same input node to each of the plurality of settlement routes or a same output node from each of the plurality of settlement routes. The at least one processor may be programmed to: (i) receive an initiation message including a transaction identifier (TID) and a product code associated with a completed transaction; (ii) in response to receiving the initiation message, execute a settlement engine having access to a modular distribution message template; (iii) query, by the settlement engine, a remote data aggregator using the TID, to cause the remote data aggregator to return a resource channel indicator, indicating a type of a resource channel used in the completed transaction, and limited data elements that are associated with the resource channel type; (iv) based on the resource channel indicator, populate, by the settlement engine, the modular distribution message template with the TID, the product code, and the limited data elements to generate a distribution message; and/or (v) based on the resource channel indicator, route, by the settlement engine, the distribution message to a corresponding one of the plurality of settlement routes.

In some aspects, the RR computing device may further include a DR module, which may be programmed to: (a) receive, from the settlement route, a confirmation message; (b) generate a distribution record corresponding to the confirmation message; and/or (c) write the distribution record to the at least one memory.

In some further aspects, the distribution record may include the TID, a settlement amount, and the product code.

In some still further aspects, a new settlement route may be added to the plurality of settlement routes, and the at least one processor may be further programmed to: (a) communicatively connect the new settlement route to the settlement engine at the input node; and/or (b) communicatively connect the new settlement route to the DR module at the output node.

In some aspects, the distribution message may include the TID, a settlement amount, and the product code, and the limited data elements may include a source identifier and a destination identifier.

In some additional aspects, the settlement route is a first settlement route, and the at least one processor may be further programmed to: (a) receive a second initiation message including a second TID and a second product code associated with a second completed transaction; (b) in response to receiving the second initiation message, execute the settlement engine; (c) query, by the settlement engine, the remote data aggregator using the second TID, to cause the remote data aggregator to return a second resource channel indicator, indicating a different type of a resource channel used in the second completed transaction, and different limited data elements that are associated with the different resource channel type; (d) based on the second resource channel indicator, populate, by the settlement engine, the modular distribution message template with the second TID, the second product code, and the different limited data elements to generate a second distribution message; and/or (e) based on the second resource channel indicator, route, by the settlement engine, the distribution message to a corresponding second settlement route of the plurality of settlement routes, the second settlement route different from the first settlement route.

In some aspects, the initiation message may include a respective TID and product code for each of a plurality of completed transactions including the completed transaction.

In certain aspects, the at least one processor may be further programmed to query the remote data aggregator using each of the TIDs associated with each of the plurality of completed transactions, to cause the remote data aggregator to return a respective resource channel indicator associated with each of the plurality of completed transactions.

In another aspect of the present disclosure, a computer-implemented method for settlement distribution may be provided. The method may be implemented using an RR computing device including a memory and a processor communicatively coupled to the memory. The RR computing device may be modularly coupled to and in network communication with a plurality of parallel settlement routes such that the RR computing device is at least one of a same input node to each of the plurality of settlement routes or a same output node from each of the plurality of settlement routes. The method may include: (i) receiving an initiation message including a transaction identifier (TID) and a product code associated with a completed transaction; (ii) in response to receiving the initiation message, executing a settlement engine having access to a modular distribution message template; (iii) querying, by the settlement engine, a remote data aggregator using the TID, to cause the remote data aggregator to return a resource channel indicator, indicating a type of a resource channel used in the completed transaction, and limited data elements that are associated with the resource channel type; (iv) based on the resource channel indicator, populating, by the settlement engine, the modular distribution message template with the TID, the product code, and the limited data elements to generate a distribution message; and/or (v) based on the resource channel indicator, routing, by the settlement engine, the distribution message to a corresponding one of the plurality of settlement routes.

In some aspects, the method may further include: (a) receiving, from the settlement route, a confirmation message; (b) generating a distribution record corresponding to the confirmation message; and/or (c) writing the distribution record to a reporting database.

In some additional aspects, the settlement engine is an input node to the plurality of settlement routes and a DR of the RR computing device is an output node from the plurality of settlement routes. A new settlement route may be added to the plurality of settlement routes, and the method may further include: (a) communicatively connecting the new settlement route to the settlement engine at the input node; and/or (b) communicatively connecting the new settlement route to the DR module at the output node.

In certain aspects, the settlement route is a first settlement route, and the method may further include: (a) receiving a second initiation message including a second TID and a second product code associated with a second completed transaction; (b) in response to receiving the second initiation message, executing the settlement engine; (c) querying, by the settlement engine, the remote data aggregator using the second TID, to cause the remote data aggregator to return a second resource channel indicator, indicating a different type of a resource channel used in the second completed transaction, and different limited data elements that are associated with the different resource channel type; (d) based on the second resource channel indicator, populating, by the settlement engine, the modular distribution message template with the second TID, the second product code, and the different limited data elements to generate a second distribution message; and/or (e) based on the second resource channel indicator, routing, by the settlement engine, the distribution message to a corresponding second settlement route of the plurality of settlement routes, the second settlement route different from the first settlement route.

In some further aspects, the initiation message may include a respective TID and product code for each of a plurality of completed transactions including the completed transaction, and the method may further include querying the remote data aggregator using each of the TIDs associated with each of the plurality of completed transactions, to cause the remote data aggregator to return a respective resource channel indicator associated with each of the plurality of completed transactions

ADDITIONAL CONSIDERATIONS

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured or unstructured collection of records or data that is stored in a computer system. The above examples are not intended to limit in any way the definition and/or meaning of the term database. Examples of RDBMS's include, but are not limited to, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In another embodiment, a computer program is provided, and the program is embodied on a computer-readable medium. In an exemplary embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process may be practiced independent and separate from other components and processes described herein. Each component and process may also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

Disjunctive language such as the phrase "at least one of X, Y, or Z," unless specifically stated otherwise, is generally understood within the context as used to state that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase "at least one of X, Y, and Z," unless specifically stated otherwise, should also be understood to mean X, Y, Z, or any combination thereof, including "X, Y, and/or Z."

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A modular settlement distribution architecture comprising:

a reporting database; and a resource routing (RR) computing device comprising at least one processor and at least one memory device, the RR computing device modularly coupled to and in network communication with a plurality of parallel settlement routes such that the RR computing device is at least one of a same input node to each of the plurality of settlement routes or a same output node from each of the plurality of settlement routes, the at least one processor programmed to:

receive an initiation message including a transaction identifier (TID) and a product code associated with a completed transaction;

in response to receiving the initiation message, execute a settlement engine having access to a modular distribution message template;

query, by the settlement engine, a remote data aggregator using the TID, to cause the remote data aggregator to return a resource channel indicator, indicating a type of a resource channel used in the completed transaction, and limited data elements that are associated with the resource channel type;

based on the resource channel indicator, populate, by the settlement engine, the modular distribution message template with the TID, the product code, and the limited data elements to generate a distribution message;

based on the resource channel indicator, route, by the settlement engine, the distribution message to a corresponding first settlement route of the plurality of settlement routes;

receive a second initiation message including a second TID and a second product code associated with a second completed transaction;

in response to receiving the second initiation message, execute the settlement engine;

query, by the settlement engine, the remote data aggregator using the second TID, to cause the remote data aggregator to return a second resource channel indicator, indicating a different type of a resource channel used in the second completed transaction, and different limited data elements that are associated with the different resource channel type;

based on the second resource channel indicator, populate, by the settlement engine, the modular distribution message template with the second TID, the second product code, and the different limited data elements to generate a second distribution message; and based on the second resource channel indicator, route, by the settlement engine, the distribution message to a corresponding second settlement route of the plurality of settlement routes, the second settlement route different from the first settlement route.

2. The modular settlement distribution architecture of claim 1, further comprising a distribution and reporting (DR) module, wherein the DR module is programmed to:

receive, from the first settlement route, a confirmation message;

generate a distribution record corresponding to the confirmation message; and write the distribution record to the reporting database.

3. The modular settlement distribution architecture of claim 2, wherein the settlement engine is the input node to the plurality of settlement routes and the DR module is the output node from the plurality of settlement routes.

4. The modular settlement distribution architecture of claim 3, wherein a new settlement route is added to the plurality of settlement routes, wherein the at least one processor is further programmed to:

communicatively connect the new settlement route to the settlement engine at the input node; and communicatively connect the new settlement route to the DR module at the output node.

5. The modular settlement distribution architecture of claim 1, wherein the limited data elements are, based upon the resource channel type, a minimum number of corresponding data elements that will enable the distribution message to be accurately processed by the first settlement route.

6. The modular settlement distribution architecture of claim 1, wherein the RR computing device is communicatively coupled to each of the plurality of settlement routes using a separate API connection.

7. A resource routing (RR) computing device comprising at least one memory and at least one processor communicatively coupled to the at least one memory, the RR computing device modularly coupled to and in network communication with a plurality of parallel settlement routes such that the RR computing device is at least one of a same input node to each of the plurality of settlement routes or a same output node from each of the plurality of settlement routes, the at least one processor programmed to:

receive an initiation message including a transaction identifier (TID) and a product code associated with a completed transaction;

in response to receiving the initiation message, execute a settlement engine having access to a modular distribution message template;

query, by the settlement engine, a remote data aggregator using the TID, to cause the remote data aggregator to return a resource channel indicator, indicating a type of a resource channel used in the completed transaction, and limited data elements that are associated with the resource channel type;

based on the resource channel indicator, populate, by the settlement engine, the modular distribution message template with the TID, the product code, and the limited data elements to generate a distribution message;

based on the resource channel indicator, route, by the settlement engine, the distribution message to a corresponding first settlement route of the plurality of settlement routes;

receive a second initiation message including a second TID and a second product code associated with a second completed transaction;

in response to receiving the second initiation message, execute the settlement engine;

query, by the settlement engine, the remote data aggregator using the second TID, to cause the remote data aggregator to return a second resource channel indicator, indicating a different type of a resource channel used in the second completed transaction, and different limited data elements that are associated with the different resource channel type;

based on the second resource channel indicator, populate, by the settlement engine, the modular distribution message template with the second TID, the second product code, and the different limited data elements to generate a second distribution message; and based on the second resource channel indicator, route, by the settlement engine, the distribution message to a corresponding second settlement route of the plurality of settlement routes, the second settlement route different from the first settlement route.

8. The RR computing device of claim 7, further comprising a distribution and reporting (DR) module, wherein the DR module is programmed to:

receive, from the first settlement route, a confirmation message;

generate a distribution record corresponding to the confirmation message; and write the distribution record to the at least one memory.

9. The RR computing device of claim 8, wherein the distribution record comprises the TID, a settlement amount, and the product code.

10. The RR computing device of claim 8, wherein a new settlement route is added to the plurality of settlement routes, wherein the at least one processor is further programmed to:

communicatively connect the new settlement route to the settlement engine at the input node; and communicatively connect the new settlement route to the DR module at the output node.

11. The RR computing device of claim 7, wherein the distribution message comprises the TID, a settlement amount, and the product code, and wherein the limited data elements comprise a source identifier and a destination identifier.

12. The RR computing device of claim 7, wherein the initiation message includes a respective TID and product code for each of a plurality of completed transactions including the completed transaction.

13. The RR computing device of claim 12, wherein the at least one processor is further programmed to:

query the remote data aggregator using each of the TIDs associated with each of the plurality of completed transactions, to cause the remote data aggregator to return a respective resource channel indicator associated with each of the plurality of completed transactions.

14. A computer-implemented method for settlement distribution, the method implemented using a resource routing (RR) computing device including a memory and a processor communicatively coupled to the memory, the RR computing device modularly coupled to and in network communication with a plurality of parallel settlement routes such that the RR computing device is at least one of a same input node to each of the plurality of settlement routes or a same output node from each of the plurality of settlement routes, the method comprising:

receiving an initiation message including a transaction identifier (TID) and a product code associated with a completed transaction;

in response to receiving the initiation message, executing a settlement engine having access to a modular distribution message template;

querying, by the settlement engine, a remote data aggregator using the TID, to cause the remote data aggregator to return a resource channel indicator, indicating a type of a resource channel used in the completed transaction, and limited data elements that are associated with the resource channel type;

based on the resource channel indicator, populating, by the settlement engine, the modular distribution message template with the TID, the product code, and the limited data elements to generate a distribution message;

based on the resource channel indicator, routing, by the settlement engine, the distribution message to a corresponding first settlement route of the plurality of settlement routes;

receiving a second initiation message including a second TID and a second product code associated with a second completed transaction;

in response to receiving the second initiation message, executing the settlement engine;

querying, by the settlement engine, the remote data aggregator using the second TID, to cause the remote data aggregator to return a second resource channel indicator, indicating a different type of a resource channel used in the second completed transaction, and different limited data elements that are associated with the different resource channel type;

based on the second resource channel indicator, populating, by the settlement engine, the modular distribution message template with the second TID, the second product code, and the different limited data elements to generate a second distribution message; and based on the second resource channel indicator, routing, by the settlement engine, the distribution message to a corresponding second settlement route of the plurality of settlement routes, the second settlement route different from the first settlement route.

15. The computer-implemented method of claim 14, further comprising:

receiving, from the first settlement route, a confirmation message;

generating a distribution record corresponding to the confirmation message; and writing the distribution record to a reporting database.

16. The computer-implemented method of claim 14, wherein the settlement engine is the input node to the plurality of settlement routes and a distribution and reporting (DR) module of the RR computing device is the output node from the plurality of settlement routes, and wherein a new settlement route is added to the plurality of settlement routes, the method further comprising:

communicatively connecting the new settlement route to the settlement engine at the input node; and communicatively connecting the new settlement route to the DR module at the output node.

17. The computer-implemented method of claim 14, wherein the initiation message includes a respective TID and product code for each of a plurality of completed transactions including the completed transaction, and wherein the method further comprises:

querying the remote data aggregator using each of the TIDs associated with each of the plurality of completed transactions, to cause the remote data aggregator to return a respective resource channel indicator associated with each of the plurality of completed transactions.

* * * * *